United States Patent [19]

Hanson et al.

[11] 4,203,300
[45] May 20, 1980

[54] HORIZONTAL DIRECT FIRED WATER BATH PROPANE VAPORIZER

[75] Inventors: Robert C. Hanson, Excelsior; Leon C. Hanson, Bloomington, both of Minn.

[73] Assignee: Energy Systems Incorporated, Eden Prairie, Minn.

[21] Appl. No.: 844,634

[22] Filed: Oct. 25, 1977

[51] Int. Cl.² ............................ F22B 1/16; F17C 9/02
[52] U.S. Cl. ........................................ 62/52; 122/33; 165/106
[58] Field of Search ...................... 165/106; 62/52, 53; 122/33

[56] References Cited

U.S. PATENT DOCUMENTS

| 2,354,932 | 8/1944 | Walker et al. | 122/33 X |
| 2,582,134 | 1/1952 | Kimmell et al. | 122/33 |
| 3,724,426 | 4/1973 | Brown | 62/52 X |

Primary Examiner—Albert W. Davis, Jr.
Attorney, Agent, or Firm—Kinney, Lange, Braddock, Westman & Fairbairn

[57] ABSTRACT

A horizontal water filled vaporizer chamber is heated through the instrumentality of a horizontal combustion chamber extending through a lower portion of the vaporizer chamber. A first plenum inside the vaporizer chamber at a first end thereof receives combustion products from the chamber, and horizontal flues open to this first plenum carry these combustion products from it through the vaporizer chamber to a second plenum outside of the boiler where they are discharged up a stack. A plurality of vaporizer coils, each consisting of vertically spaced horizontal runs of pipe, extend from end to end in an upper portion of the vaporizer chamber. Each pair of adjacent pipe runs in each coil lie in a plane forming an acute angle with respect to a horizontal plane. Every vaporizer coil is connected inside the vaporizer chamber at its lower end to a liquid propane inlet header and at its upper end to a gaseous propane outlet header. A liquid propane inlet pipe and a propane vapor outlet pipe each open through the first end wall of the vaporizer chamber into their respective headers. The colder inlet header and the first horizontal run of each vaporizer coil leading from it are offset closer to a first vertical side wall of the vaporizer chamber; while the relatively warmer outlet header and a last run of each vaporizer coil leading to it are offset closer to a second vertical side wall of the vaporizer chamber. This induces a circulation of vaporizer chamber water down along the first side wall, across the combustion chamber and flues, up along the second vaporizer chamber side wall and across the top of the vaporizer chamber to enhance the heat exchange function of the vaporizer chamber water.

1 Claim, 5 Drawing Figures

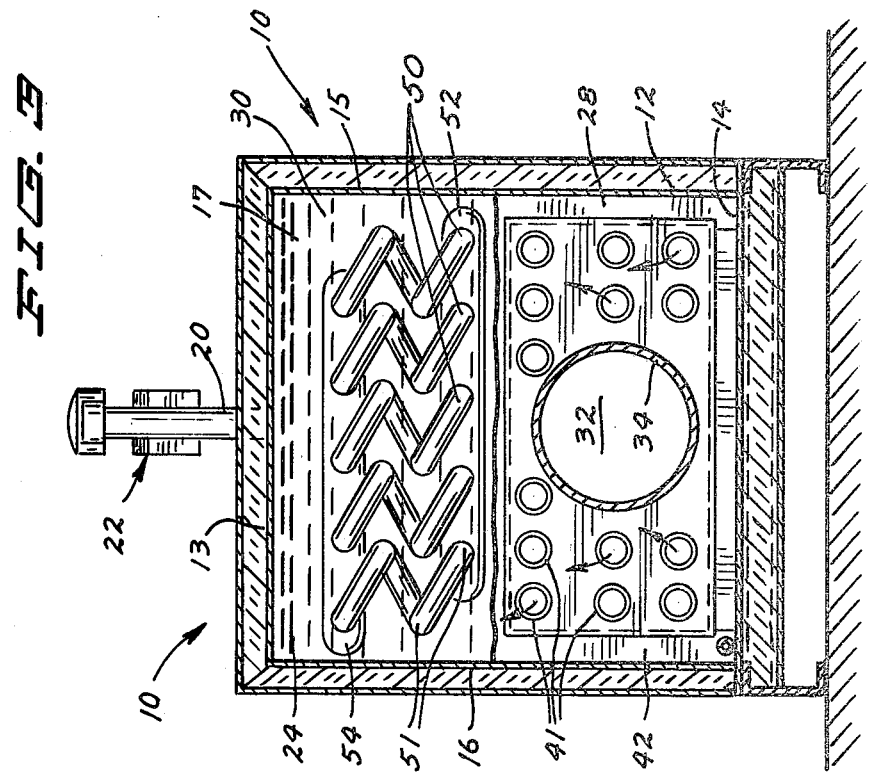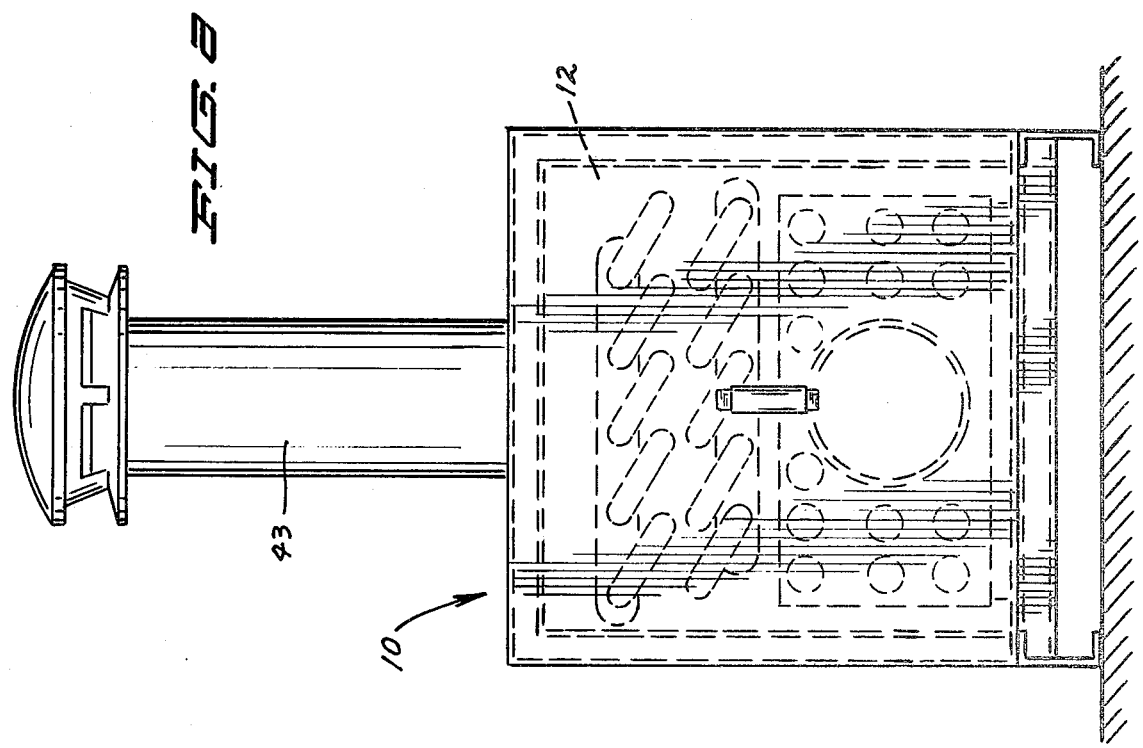

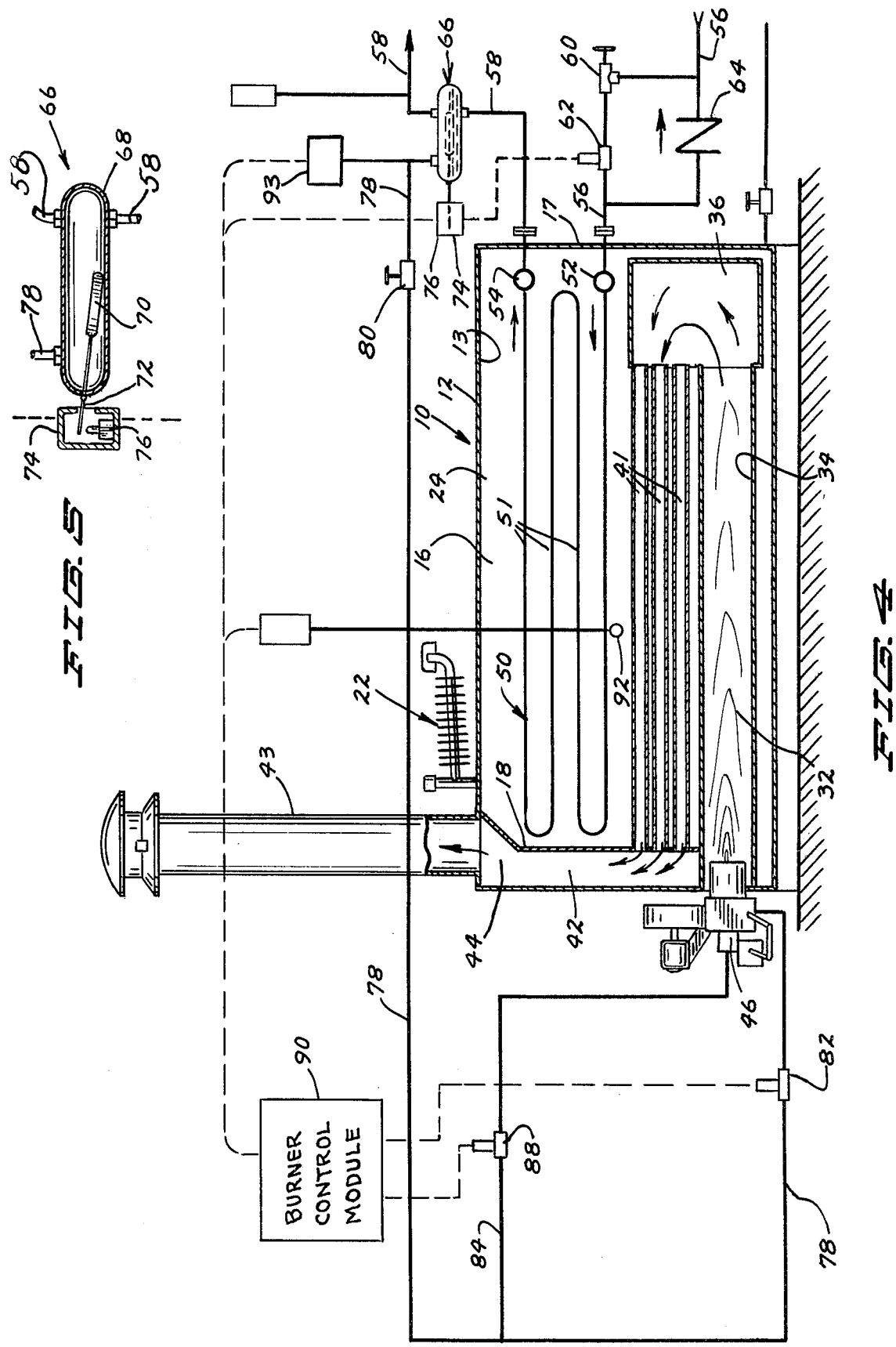

HORIZONTAL DIRECT FIRED WATER BATH PROPANE VAPORIZER

BACKGROUND OF THE INVENTION

This invention has relation to heat transfer units in which a water bath in a vaporizer chamber is used to pick up heat from an elongated direct fired combustion chamber extending horizontally from end to end through the vaporizer chamber and from a plurality of flues carrying the products of combustion from the combustion chamber back, end to end, horizontally through the vaporizer chamber; and to transmit that heat to heat transfer coils extending horizontally through the vaporizer chamber.

These units can be used to transfer the heat to any kind of a fluid passing through the heat transfer coils, but in the present illustration, the heat is used to vaporize liquid propane.

Much greater heat transfer efficiency can be obtained in such a system where it is possible to cause the water bath to circulate between the area where the heat is being received into the water bath from the direct fired combustion chamber and flues and the area where the heat is being delivered from that bath to the heat transfer coils. Before the present invention, however, without special pumps operating on and/or in the water bath itself, the best circulation that could be obtained was a straight up bubbling or boiling kind of action due to the intense heat below and the uniform cooling effect of the coils above.

By using such pumps in the water bath to circulate the water of the water bath, better heat transfer characteristics were obtained. However, such pumps must operate at the elevated water bath temperatures and so are subject to high maintenance needs, use additional (otherwise wasted) power and are particularly difficult or impossible to maintain in service at least without shutting down the heat transfer unit.

In order to develop an automatic natural pattern of circulation of the water in the water bath, the present invention was developed.

No preliminary search of the prior art has been made.

BRIEF SUMMARY OF INVENTION

A heat transfer unit includes a water filled vaporizer chamber having a horizontally disposed longitudinal axis. The vaporizer chamber has a lower heat receiving portion and an upper heat delivering portion. The lower portion can include a large cylindrical combustion chamber open to and through the vaporizer chamber for receiving fuel from a horizontally firing gun-type gas burner and for receiving air sufficient to support combustion within the combustion chamber; a first plenum chamber at a first end of the vaporizer chamber, immersed in the water bath and open to the combustion chamber; and a plurality of substantially horizontally extending flues for carrying the products of combustion from the first plenum back to the original or second end of the vaporizer chamber where they can open through that end of the vaporizer chamber to a second plenum or chimney chamber to pass upwardly and away from the vaporizer chamber. Alternatively, other means can be provided to heat the bath water in the lower portion of the vaporizer chamber.

The upper heat delivering portion of the vaporizer chamber will contain a network of heat transfer coils. This network will consist of a number of heat transfer coils each having a plurality of vertically spaced, series connected, horizontal runs of pipe extending back and forth through the water bath, every coil being open to a lower, inlet header into which the fluid to be heated is fed, and every coil also being open to an upper, outlet header from which the heated fluid is discharged.

The inlet header and the inlet runs of each of the heat transfer coils are situated below and closer to one upright side wall of the vaporizer chamber; and the outlet header and outlet runs of the heat transfer coils are situated above and closer to an opposite upright side wall of the vaporizer chamber. This causes the water in the water bath to have a much higher average temperature on the side of the vaporizer chamber adjacent the point where the heated fluid leaves the coils than on the side where the fluid to be heated enters them. This difference in average temperature results in the water circulating up on the hot side and down on the cold side so that a circulation of water from the heat receiving portion of the vaporizer chamber will flow first around the upper "hot" end runs of the heat transfer coils and then down through the lower "cold" end runs of those coils and back into the heat receiving portion of the vaporizer chamber. This automatically induced natural circulation greatly facilitates the heat transfer process.

While the water bath medium has been referred to throughout, it is to be understood that many other liquids could serve as the "water bath" medium; and reference to "water" in this specification and claims is to be read to include those other substances.

IN THE DRAWINGS

FIG. 1 is a vertical longitudinal sectional view of a water bath vaporizer of the present invention;

FIG. 3 is an enlarged vertical sectional view taken on the line 3—3 in FIG. 1;

FIG. 4 is a schematic representation of the vaporizer of FIG. 1 and of certain supply and discharge conduits and operational controls associated therewith; and FIG. 5 is a vertical sectional view of one type of liquid float and liquid inlet cutoff switch which has been found useful with the vaporizer of the invention.

DESCRIPTION OF PREFERRED EMBODIMENT

Figure 2:
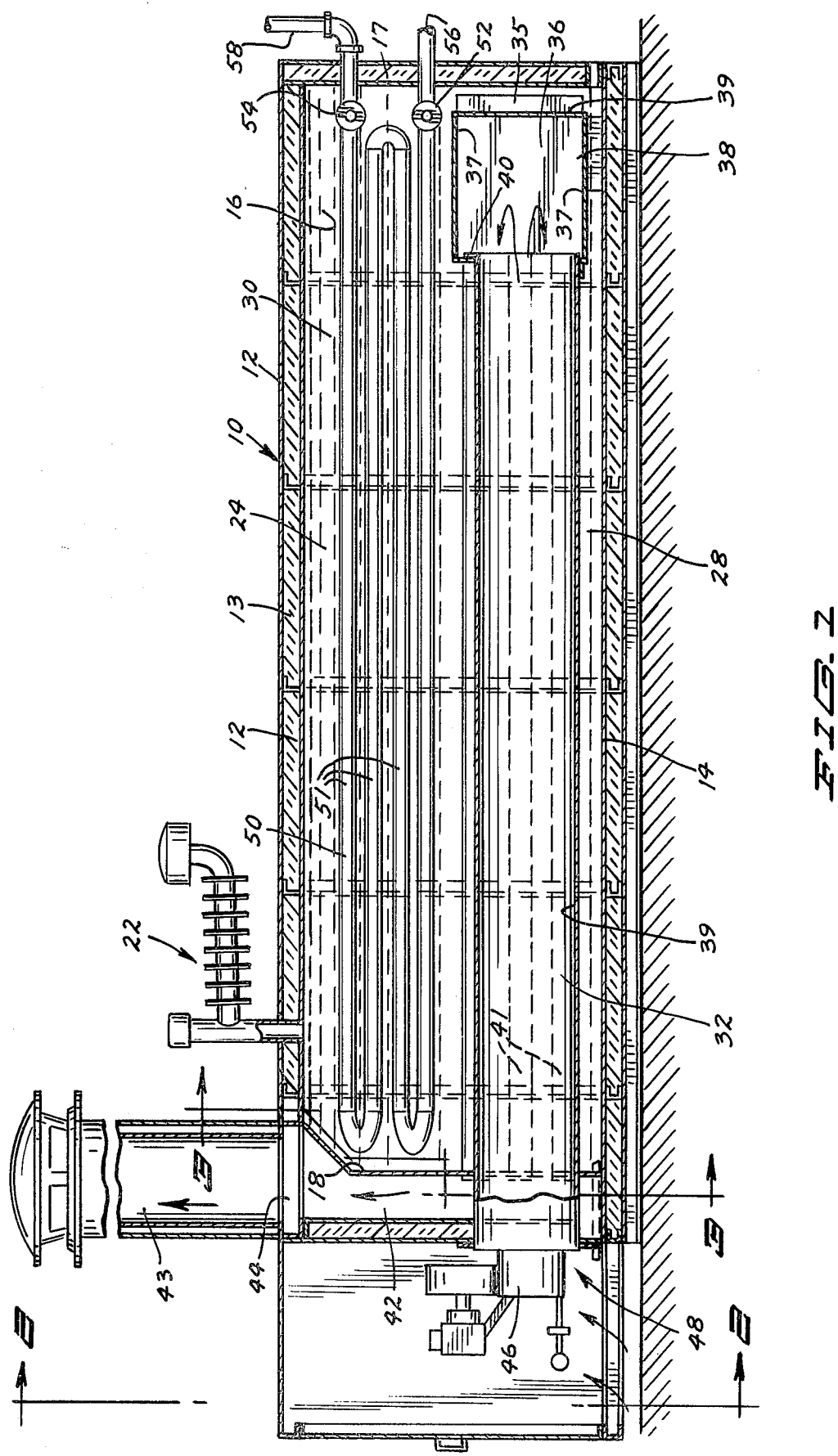
FIG. 2 is an enlarged end elevational view of the vaporizer of FIG. 1 as seen from the left in that figure.

A horizontal direct fired water bath propane vaporizer 10 includes a rectangular water filled vaporizer chamber 12 having a horizontally disposed rectangular vaporizer chamber top wall 13 and vaporizer chamber bottom wall 14, a first vertical vaporizer chamber side wall 15, a second vertical vaporizer chamber side wall 16, a first vertical vaporizer chamber end wall 17, and a second vertical vaporizer chamber end wall 18; the whole forming a liquid-tight vessel which can be filled and kept filled with a water bath 24 through a vertical filler pipe 20. This filler pipe forms a part of a breather attachment 22 which is described in my co-pending application Ser. No. 746,806, filed Dec. 2, 1976, the disclosure of which is incorporated herein by this reference and made a part hereof.

In the form of the invention as shown, a lower half 28 of the vaporizer chamber 12 lying below a horizontal plane passing approximately through the midpoint of the vaporizer chamber constitutes a heat receiving portion of the vaporizer chamber. Similarly, an upper half 30 of the vaporizer chamber above such horizontal plane constitutes a heat delivering portion thereof.

A cylindrical, horizontally disposed, combustion chamber 32 is defined by a cylindrical combustion chamber wall 34 and is open through second vertical end wall 18 clear through to a combustion products reversal first plenum chamber 36 which is defined by rectangular top and bottom plenum walls 37, parallel spaced apart vertical plenum side walls 38, a first vertical plenum end wall 39, and a second vertical plenum end wall 40. Vertical heat conducting fins 35 on the vertical end wall 39 aid in heat transfer from the plenum to the water bath.

A plurality of horizontal flue pipes 41 are positioned symmetrically on either side of the combustion chamber 32 and extend from the first plenum chamber 36, through the second vertical vaporizer chamber end wall 18 and into a single chimney chamber or second plenum 42. This second plenum is connected to an appropriate vertical stack 43 to provide egress for the products of combustion through a chimney chamber opening 44.

While the combustion heat source can take several different forms, a particularly effective form is illustrated as a horizontally firing gun-type gas burner 46.

In operation, combustion products of the fuel from the gas burner 46 and including the secondary air drawn into the combustion chamber around the burner as at 48 pass the entire length of the combustion chamber 32 and into the plenum 36, back out through the horizontal flues 41, into the chimney chamber 42 and out through opening 44 into the vertical stack 43. The combustion chamber, horizontal flues and plenum being completely surrounded by the water bath 24, there is a good transfer of heat from each to the water bath.

While the flues 41 are shown to be symmetrically positioned with respect to a vertical plane passing through the horizontal axis of the combustion chamber 32, it is to be understood that more flues could be placed on one side of the chamber than the other in order to get an increase of heat transfer into the water bath on that side, for reasons to be brought out subsequently.

Referring now to the upper vaporizer chamber half 30, a plurality of mutually parallel vaporizer coils 50 extend from a lower horizontal liquid propane inlet header 52 disposed in parallel spaced relationship to the first vaporizer chamber end wall 17 to a horizontal upper horizontal propane vapor outlet header 54 positioned in spaced adjacent relation to the second vaporizer chamber end wall 18, in the form of the invention as shown. Each coil is made up of a plurality of vertically spaced, series connected, horizontal, mutually parallel runs of pipe 51. As best seen in FIG. 3, a plane defined by each adjacent pair of pipe runs of each of the vaporizer coils lies at an acute angle with respect to an imaginary horizontal plane dividing the upper vaporizer chamber half from the lower vaporizer chamber half. The inlet run 51 of each vaporizer coil 50 is situated to the right of the outlet run of that coil, as seen in that figure. The lower inlet header 52 and the upper outlet header 54 are likewise staggered from right to left as seen in that figure.

The lower header 52 is open to a liquid propane inlet pipe 56 which extends through the first vertical vaporizer chamber end wall 17 of the vaporizer chamber 12 from a source of liquid propane (not shown); while the upper outlet header 54 is open to a propane vapor outlet pipe 58, also open through vaporizer chamber end wall 17 to carry the vaporized propane to a location for storage or use (not shown).

In use, liquid propane under pressure is introduced into propane inlet pipe 56, and the propane vapor is discharged from outlet pipe 58. A manually operable propane cutoff valve 60 is situated in liquid propane inlet pipe 56 between the inlet header 52 and the source of liquid propane under pressure (not shown). A solenoid operated liquid propane cutoff valve 62 is situated in inlet pipe 56 between the valve 60 and inlet header 52. A one-way check valve 64 is connected across the valves 60 and 62 to allow excess liquid propane in the inlet header 52 and in vaporizer coils 50 to flow back to the source of liquid propane.

Propane vapor outlet pipe 58 extends from upper outlet header 54 to the bottom of a liquid float or sensor 66 and extends out of the top of that float 66 to a location for use of the gaseous propane, not shown.

Float or sensor 66 includes a float chamber 68. A float 70 is in the float chamber and is pivotally mounted with respect to it by a rigid switch activator arm 72 which extends inside of a switch housing 74 housing in position to activate a liquid inlet cutoff switch 76.

The gas to fire the gas burner 46 can be obtained from the propane vaporizer itself, and to this end, a gas burner supply line 78 opens from the top of the float chamber 68 through a manual gas burner control valve 80 and through a solenoid operated main gas supply cutoff valve 82 and through a suitable pressure regulator (not shown) to the burner 46. A pilot gas supply line 84 extends from gas burner supply line 78 to the pilot (not shown) within the gas burner 46 through a solenoid operated pilot gas supply cutoff valve 88 and pressure regulator (not shown).

The liquid cutoff switch 76 is operably connected to the solenoid operated liquid cutoff valve 62 through the instrumentality of appropriate electrical control lines which are indicated schematically in dotted lines. Similarly, dotted lines indicate the electrical control lines connection back to a burner control module 90, not only from the switch 76, but also from gas cutoff control valves 82 and 88. Other controls and supply lines will be utilized as appropriate and necessary to the safe and efficient operation of the vaporizer, but most of these have been omitted in the interest of clarity. These additional controls can be of any usual or preferred construction forming no part of the invention in and of themselves.

OPERATION

Initially the gas supply to the gas burner 46 is supplied automatically by an auto-start pressure switch 93 which opens liquid inlet solenoid 62 until vapor pressure is sensed in gas burner supply line 78 to the burner. The switch 93 can be of any usual or preferred construction. Once the burner is in operation, the combustion products will be carried through the vaporizer chamber 12 in the manner described above, and heat will be received into the water bath and delivered into the vaporizer coils 50. After sufficient heat transfer, the liquid propane will turn to gas within the vaporizer coils and will flow to the top of those coils, into the outlet header 54 and up into the float chamber 68. The liquid propane will drain back through the propane vapor outlet pipe 58 into the header 54, and into the coils to itself be vaporized. When the float 70 "sinks" in the float chamber 68 until the switch activating arm 72 clears the actuator on liquid inlet cutoff switch 76, the switch will open causing solenoid operated liquid cutoff valve 62 to open allowing liquid propane to pass through open cutoff valve 60 and liquid propane inlet pipe 56 to the header 52. By using a plurality of temperature sensors 92 (only one is shown) inside of the vaporizer chamber 12, the amount of heat made available by the gas burner 46 can be controlled so that there will always be vapor in the upper portions of each of the vaporizer coils 50 and in the horizontal outlet header 54. Then there will always be gaseous propane in the float chamber 68. As long as the draw of such gaseous propane from the propane vapor outlet pipe 58 is at a more or less uniform rate, this situation will prevail.

However, should the withdrawal of gaseous propane be at an excessive rate that cannot be sensed in the terms of the temperature of the water bath fast enough to prevent the movement of liquid propane into the upper outlet header 54 and into the outlet pipe 58, that liquid will cause float 70 to rise, actuating liquid inlet cutoff switch 76, and blocking liquid propane inlet pipe 56 at the solenoid operated liquid cutoff valve 62. This blockage will remain until the vaporizer has "caught up", the liquid propane left the float chamber of the liquid float 66, and the cutoff switch 76 de-activated.

Should the withdrawal of gaseous propane from propane vapor outlet pipe 58 be severely reduced or even cut off, there will be a build-up of heat within the vaporizer chamber, and excessive pressure of the propane as it turns to the gaseous phase can build up in the vaporizer coils 50. This pressure is relieved as liquid propane is forced back through the check valve 64 and back through liquid propane inlet pipe 56 to the source of the liquid propane under pressure (not shown).

With the vaporizer producing gaseous propane in the manner described above, the liquid propane entering the inlet header 52 and passing through the first, bottom pipe runs 51 more closely adjacent to the first vertical vaporizer chamber side wall 15 (to the right as seen in FIG. 3) is much colder than the upper outlet header 54 and the last, top outlet pipe runs 51, carrying as they do the propane vapor now warmed to close to the temperature of the vaporizer chamber water. Thus, the effective average path of the propane through each of the coils is from a position adjacent the bottom of the upper portion of the vaporizer chamber and nearer to the first vaporizer chamber side wall to a position closer to the top of the upper portion and nearer to the second vaporizer chamber side wall. This causes the average temperature of the water bath 24 on the righthand side of the vaporizer chamber as seen in FIG. 3 to be, on the average, substantially colder than the corresponding water bath on the lefthand side of the vaporizer chamber as seen in that figure. This induces a generally clockwise flow within the water bath, thus greatly enhancing the heat transfer both of the combustion chamber 32 and flue pipes 41 to the water bath and from the water bath to the vaporizer coils 50.

This circulation can be further enhanced by providing more horizontal flue pipes 41 on the lefthand side of the combustion chamber 32 as seen in FIG. 3 than on the right side thereof. This has the effect of even further raising the temperature of the water bath on the left hand side of the vaporizer chamber as seen in FIG. 3 and so increases the heat transfer circulation.

The embodiments of the invention in which an exclusive property or privilege is claimed are defined as follows:

1. A heat transfer unit for delivering heat energy to a fluid, said unit including:
   A. a horizontal water vaporizer chamber having a major horizontal longitudinal dimension and a lower, heat receiving portion open to an upper heat delivering portion, said vaporizer chamber being partially defined by first and second parallel, upright, longitudinally extending side walls;
   B. a water bath filling said vaporizer chamber;
   C. means including horizontally and longitudinally extending heat sources in said lower portion of said vaporizer chamber and surrounded by said water bath for delivering heat energy to said water bath;
   D. a heat exchange network of hollow, generally horizontally and longitudinally extending mutually substantially parallel heat transfer pipes in said upper portion of said vaporizer chamber and surrounded by said water bath, each of said pipes forming a part of a series connected heat transfer coil, each such coil extending from a lower inlet coil end thereof progressively upward to an upper outlet coil end;
   E. an inlet pipe extending from outside the vaporizer chamber to connect with the inlet coil end of each of such heat transfer coils to carry a fluid to be heated into said network;
   F. an outlet pipe extending from each of said outlet coil ends to the outside of the vaporizer chamber to carry said fluid away from said network after it has been heated; and
   G. the effective average path of fluid through each of said coils being from position adjacent the bottom of the upper portion of the vaporizer chamber and nearer to said first vaporizer chamber side wall to position closer to the top of said upper portion and nearer to said second vaporizer chamber side wall.

* * * * *